(12) United States Patent
Zong (10) Patent No.: US 8,315,661 B2
(45) Date of Patent: Nov. 20, 2012

(54) ENHANCED POWER HEADROOM REPORTING

(75) Inventor: Pingping Zong, Randolph, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 508 days.

(21) Appl. No.: 12/650,962

(22) Filed: Dec. 31, 2009

(65) Prior Publication Data

US 2011/0159912 A1    Jun. 30, 2011

(51) Int. Cl.
*H04B 1/00* (2006.01)
*H04B 7/00* (2006.01)
*H04B 17/00* (2006.01)

(52) U.S. Cl. .............. 455/522; 455/67.1; 455/226.1; 455/63.1; 455/69

(58) Field of Classification Search .......... 455/522, 455/69, 127.1, 63.1, 67.11, 226.1
See application file for complete search history.

(56) References Cited

U.S. PATENT DOCUMENTS

| | | | |
|---|---|---|---|
| 8,223,708 B2* | 7/2012 | Guo | 370/329 |
| 2009/0175187 A1* | 7/2009 | Jersenius et al. | 370/252 |
| 2009/0191910 A1 | 7/2009 | Athalye et al. | |
| 2010/0158147 A1* | 6/2010 | Zhang et al. | 375/260 |
| 2011/0092217 A1* | 4/2011 | Kim et al. | 455/450 |
| 2011/0105173 A1* | 5/2011 | Haim et al. | 455/522 |
| 2011/0164519 A1* | 7/2011 | Nishio et al. | 370/252 |
| 2011/0319112 A1* | 12/2011 | Jeong et al. | 455/509 |
| 2012/0008552 A1* | 1/2012 | Baldemair et al. | 370/328 |
| 2012/0039205 A1* | 2/2012 | Kogure et al. | 370/252 |

OTHER PUBLICATIONS

LG Electronics: "Uplink transmission under UE transmit power limitation in LTE-Advanced," 3GPP Draft; R1-094165 LTEA_UA TXP Limitation, 3rd Generation Partnership Project (3GPP), Mobile Competence Centre, Oct. 12, 2009.
European Search Report issued in European Patent Application No. EP 10016106.6 dated Mar. 31, 2011.
Release 8 CR or TEI-9 U-Plane Enhancement, Power Headroom Report to support SV-LTE; Qualcomm Europe; 3GPP TSG-RAN WG2 #67; Aug. 24-28, 2009, Shenzhen, China.

* cited by examiner

*Primary Examiner* — Tilahun B Gesesse (57) ABSTRACT

Method and system for power headroom reporting in a mobile device capable of supporting multiple radio transmissions via different channels. The available maximum power variation of a second channel is estimated based on power usage in radio transmission of a first channel. A plurality of measures related to radio transmission via the second channel are them computed. Whether one or more conditions for power headroom reporting of the second channel are met is tested in accordance with a configuration with respect to power headroom reporting. The power headroom is computed based on the estimated power variation relating to the first channel and the radio transmission measures relating to the second channel. A power headroom report is then generated based on the computed power headroom and such a report is then transmitted, typically from the mobile device to a base station.

22 Claims, 5 Drawing Sheets

ENHANCED POWER HEADROOM REPORTING

TECHNICAL FIELD

The present teaching relates generally to wireless communications. More specifically, the present teaching relates to method and system for power headroom computation and report thereof as well as systems incorporating the same.

BACKGROUND

Figure 1:
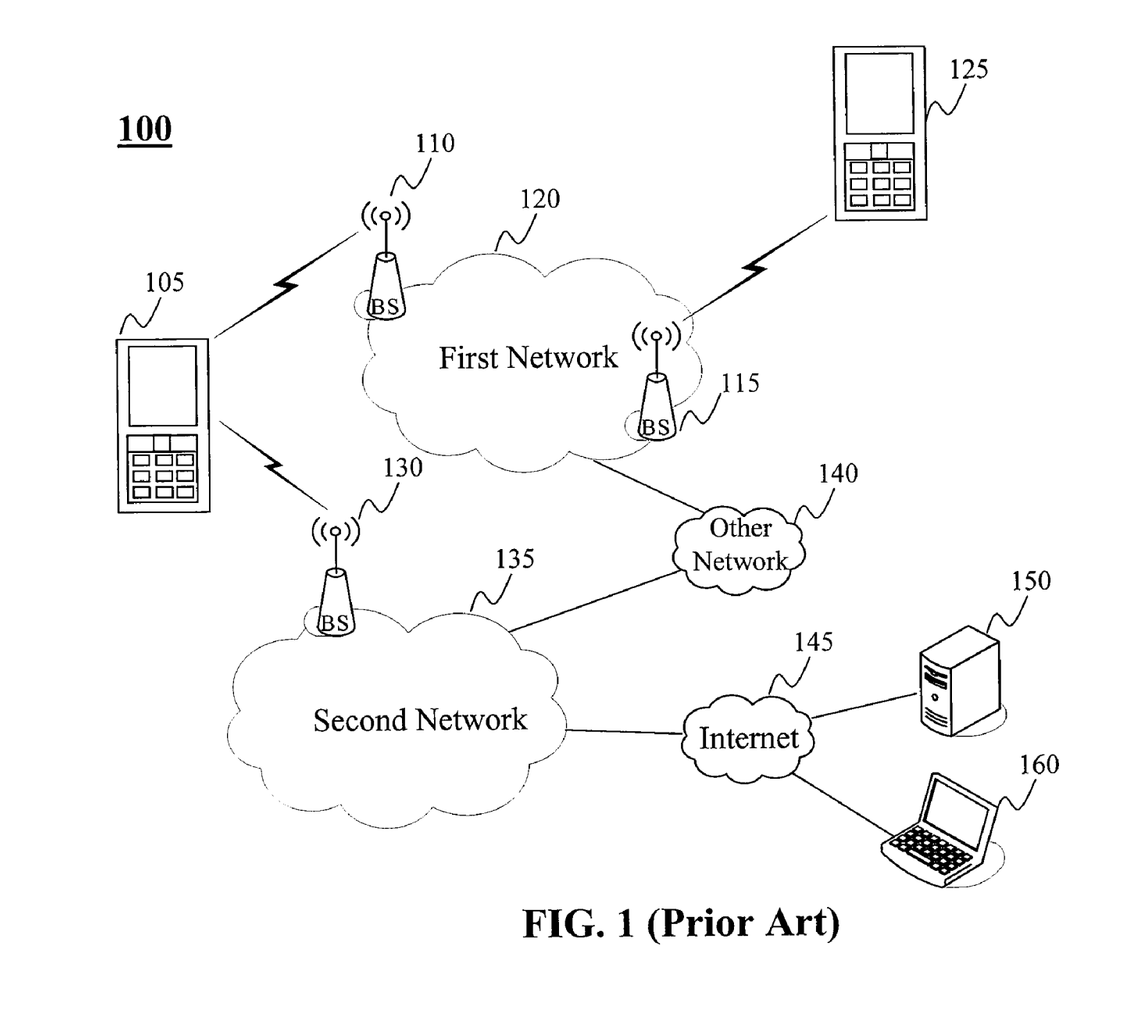
FIG. 1 (Prior Art) shows a network configuration in which a wireless device is capable of simultaneous multiple radio transmissions.

In recent years, mobile communications devices for both voice telephone services and data services such as email or text messaging or even multi-media services has become commonplace among mobile professionals and throughout the more general consumer population. Simultaneous mobile voice and data services have become virtually ubiquitous across much of the world. This is shown in FIG. 1, which is a functional block diagram of an exemplary system 100 of networks for providing mobile voice telephone services and various data services. For discussion purposes, diagram 100 shows two wireless networks 120 and 135 operated in accordance with, e.g., different technology standards. The networks 120 and 135 may be operated by different providers, carriers or operators. The communication networks 120 and 135 provide mobile voice telephone communications as well as other data services for numerous mobile stations.

The system 100 also includes mobile devices such as 105 and 125, typically operated by the networks' customers. Today, mobile devices typically take the form portable handsets, smart-phones personal digital assistants, or data cards for computers, although they may be implemented in other form factors. Each mobile communication network 120 or 135 provides communications between mobile stations 105 and 125 as well as communications for the mobile devices with other networks and stations outside the mobile communication networks. An inter-carrier or other intermediate network 140 may provide communication connectivity between the mobile communication networks 120 and 135. An example of such an intermediate network is a Public Switched Telephone Network (PSTN).

Each network 120 and 135 allows users of the mobile stations operating through the respective network to initiate and receive telephone calls or data to each other as well as through the public switched telephone network (PSTN) 140 connected thereto. One or both of the networks typically offers a variety of text and other data services, including services via the Internet 145, such as downloads, web browsing, e-mail, etc. via servers shown generally at 150 as well as message communications with terminal devices represented generally by the personal computer 160. To initiate a call, a user of a mobile device, e.g., 105, may communicate with one or more base stations, e.g., 110, . . . , 115 in a particular network, e.g., 120, in order to reach an intended receiver, e.g., 125. Similarly, to receive data from, e.g., a web server, a mobile device, e.g., 105 may connect with a base station in the locale where the mobile device is situated and via network 135 to connect to a server, e.g., 150 on the Internet. Mobile device 105 may be supported to perform communication with both mobile device 125 and server 150 simultaneously.

Radio access technologies for cellular mobile networks are continuously evolving to meet the future demands for higher data rates, improved coverage and capacity. The 3G Long Term Evolution (LTE) concept supports fast scheduling and link adaptation in frequency and time domains both for the uplink (UL) and the downlink (DL). This means that the resource assignment can be adjusted to the users' momentary traffic demand and channel variations. This includes the adaptation as to transmission power used by a mobile device to transmit signals based on the real-time situations. In general, excessive power usage should be avoided to save user equipment (UE) battery life and to avoid both intra-cell and inter-cell interference. The LTE specifications support a base station mechanism for controlling the transmit power of a mobile device or a user equipment (UE).

Typically, the Signal-to-Noise Ratio (SNR) or Signal-to-Noise and Interference Ratio (SINR) (when interference is accounted for) of the signals exchanged between a UE and a base station is controlled to stay below a targeted value $SNR_{target}$. The UE power usage can be dynamically adjusted based on a variety of factors. For instance, it may depend on the scheduled bandwidth for transmission. For example, the UE power needs to be shared over the allocated bandwidth (BW). In a poor radio condition, a UE may not reach the targeted SNR even with a small bandwidth allocation. In a good radio condition, the UE power may be sufficient to fill the entire available bandwidth and still reach the target SNR. For a UE in intermediate radio condition the power may be sufficient up-to a certain bandwidth. In some situations, a UE may transmit with the maximum available power and the received SNR may depend on the momentary link path gain. The power used for a UE to transmit may also depend on the path loss of a particular locale.

To ensure optimal transmission quality, link adaptation is frequently employed. Such adaptation function estimates the transmission parameters (modulation and coding) based on an estimated SNR (or SINR if interference is estimated). For example, a LTE base station usually estimates the radio propagation condition, i.e. the path gain to determine the received SNR for a certain BW allocation. To do an efficient link adaptation and scheduling, a base station needs knowledge of the uplink gain of the user. To estimate the uplink condition, the base station should know both the received power from the UE and the transmit power used by the UE. While the base station can determine the received power by measurement on the uplink transmission, the UE transmit power is commonly made known to a base station via a power headroom report from the UE that reports the transmit power to the base station. In 3GPP, a UE measures power headroom and likely also reports the power headroom. The content may be the difference, e.g., between UE maximum power and UE transmit power, either a total value or a value per resource block, or the UE transmit power, either a total value or a value per resource block. The setting of the user equipment (UE) transmit power, $P_{PUSCH}$, for the physical uplink shared channel (PUSCH) transmission in subframe i is defined by:

$$PH(i) = P_{CMAX} - \{10 * \log_{10}(M_{PUSCH}(i)) + P_{O\_PUSCH}(j) + \alpha(j) * PL + \Delta_{TF}(i) + f(i)\} [dBm] \quad (1)$$

where, PH(i) is the power headroom computed at moment i. $P_{CMAX}$ is the configured maximum UE output power. The following parameters determine the value of Pcmax: the UE power class, maximum allowed power configured by higher layer and UE's implementation margins. The expression inside the braces corresponds to the power that is used for transmission determined based on different considerations. Therefore, PH(i) aims to provide a measurement for the unused power. The actual power used for transmission depends on dynamic field situations. For instance, $M_{PUSCH}(i)$ is the bandwidth of the PUSCH transmission expressed in number of resource blocks taken from the resource allocation valid for uplink subframe i from a scheduling grant received on subframe i-$K_{PUSCH}$. $P_{O\_PUSCH}$ is a parameter with 1 dB resolution composed of the sum of an 8-bit cell specific nominal component $P_{O\_NOMINAL\_PUSCH}$ signaled via broadcast control channel (BCCH) on the physical downlink shared channel (PDSCH) in the range of [−126,24] dBm and a 4-bit UE specific component $P_{O\_UE\_PUSCH}$ signaled via radio resource control (RRC) in the range of [−8, 7] dB. α has possible values {0, 0.4, 0.5, 0.6, 0.7, 0.8, 0.9, 1} and either is signaled by a 3-bit cell specific parameter via BCCH on the PDSCH, or has constant value of 1. PL is the downlink path loss estimate calculated in the UE from a reference symbol received power (RSRP) measurement and signaled reference symbol (RS) transmit power. $\Delta_{TF}$ corresponds to a measure associated with the power used when a certain modulation is used. Item f(i) is related to the amount of increase in the signal strength determined dynamically by the network.

Figure 2:
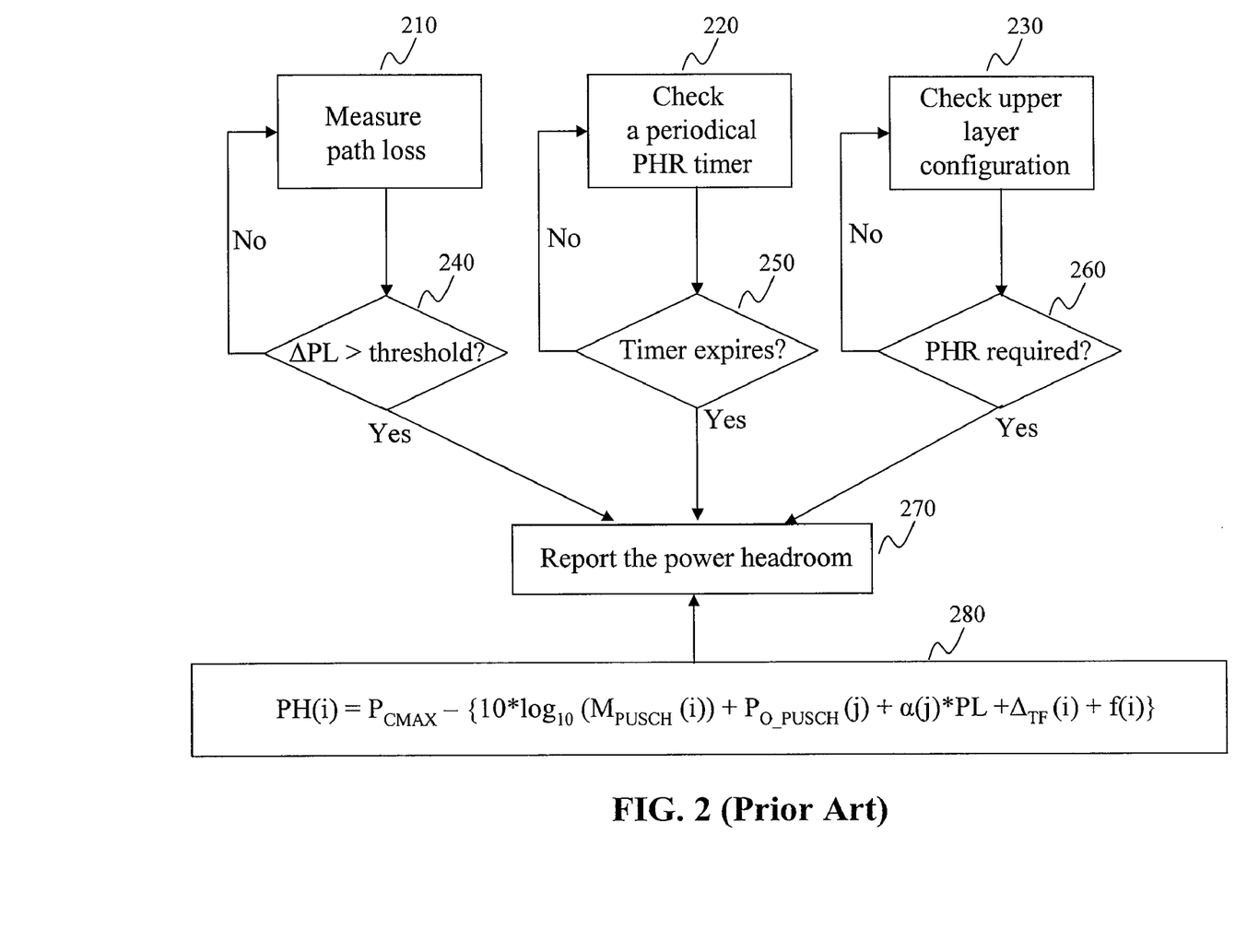
FIG. 2 (Prior Art) shows a conventional power headroom computation and reporting scheme.

In a conventional user equipment (UE), the power headroom reporting is configured to be carried out when certain conditions are met. One typical power headroom reporting procedure is shown in FIG. 2, which dictates that a power headroom reporting occurs whenever (1) a periodic timer in accordance with a set period goes off, (2) the path loss is greater than a pre-determined threshold, and (3) a power headroom report is triggered by upper layer. Conditions to trigger power headroom reporting are often configured at an upper layer. When the condition is met, the PH(i) values as computed based on formula (1) are used to generate a power headroom report and are transmitted.

Specifically, the path loss is measured at 210. If the change in pass loss (ΔP) is greater than a pre-determined threshold, tested at 240, power headroom is to be reported at 270. The reported power headroom is computed based on the formulation as specified at 280. In addition to this power headroom reporting condition, there may be others as well. For instance, the power headroom reporting can be set up to be performed periodically. In this case, a power headroom reporting (PHR) tinier is checked, at 220, periodically and if the timer is expired, determined at 250, power headroom is to be reported at 270 in accordance with the computation as set forth at 280. In some situations, power headroom reporting may also be required. For example, upper layer configuration may be checked at 230. If it is required to perform power headroom reporting, determined at 260, power headroom is computed in accordance with the formula as set at 280 and reported at 270.

As discussed herein, more UEs are now capable of simultaneous multiple radio transmissions. As a result, a UE's actual maximum transmission power may vary dynamically. For example, when a UE conducts multiple radio transmissions simultaneously for, e.g., both voice and data transmission, the actual maximum power available for the LTE network may vary and may sometimes be smaller than $P_{CMAX}$. However, the traditional power headroom computation, as illustrated in formula (1) and reporting triggering mechanism, as shown in FIG. 2, do not take into account such factors and, thus, will no longer work well. Therefore, a method and a system for power headroom computation and reporting thereof for UEs supporting simultaneous multiple radio transmissions are needed.

SUMMARY

The teachings disclosed herein relate to methods and systems for power headroom reporting by a mobile device that is capable of supporting multiple radio transmissions via different channels.

In one example, the available maximum power variation of a second channel is estimated based on power usage in radio transmission of a first channel. In addition, a plurality of measures related to radio transmission via the second channel are also computed. To control power headroom reporting, it is tested as to whether one or more conditions for power headroom reporting of the second channel are satisfied in accordance with a configuration with respect to power headroom reporting. If the one or more conditions are met, a power headroom is computed based on the estimated power variation relating to the first channel and the radio transmission measures relating to the second channel. A power headroom report is generated based on the computed power headroom and is transmitted.

As another example, a mobile device capable of supporting multiple radio transmission via different channels comprises at least one transceiver configured for providing two-way communication of information in a plurality of modes via different channels, a microprocessor configured to be a programmable controller for controlling operations of the mobile device, and a storage configured to store information to be accessed and used by the microprocessor to facilitate multiple radio transmission and operations related thereto. In such a mobile device, at least one of the at least one transceiver and the microprocessor is configured to estimate the available maximum power variation of a second channel based on power usage in radio transmission of a first channel, compute a plurality of measures related to radio transmission via the second channel, test whether one or more conditions for power headroom reporting of the second channel are met in accordance with a configuration with respect to power headroom reporting, compute a power headroom based on the estimated power variation relating to the first channel and the radio transmission measures relating to the second channel, and transmit a power headroom report generated based on the computed power headroom.

As another example, a machine-readable medium has instructions recorded thereon, which, when read by the machine, causes the machine to perform functions including estimating the available maximum power variation of a second channel based on power usage in radio transmission of a first channel and computing a plurality of measures related to radio transmission via the second channel. Execution of the instructions also causes the machine to test whether one or more conditions for power headroom reporting of the second channel are met in accordance with a configuration with respect to power headroom reporting, compute a power headroom based on the estimated power variation relating to the first channel and the radio transmission measures relating to the second channel, and transmit a power headroom report generated based on the computed power headroom.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching discloses method and system to enable a UE to properly compute and report its power headroom to a base station, when the UE's maximum transmit power varies dynamically. In accordance with the present teaching, a UE computes the power headroom (PH(i)) at moment i based on the formula below:

$$PH(i) = P_{CMAX} + \Delta P - \{10 * \log_{10}(M_{PUSCH}(i))P_{O\_PUSCH}(j) + \alpha(j) * PL + \Delta_{TF}(i) + f(i)\}[dBm] \quad (2)$$

where all items are similarly defined as discussed previously except $\Delta P$, which is added to reflect a UE's LTE maximum power variation. With this formulation, the actual maximum power is a summation of the originally configured maximum output power $P_{CMAX}$ and $\Delta P$, defined as the power usage elsewhere in the UE. While a UE supports multiple radio transmissions, there are multiple underlying applications operating simultaneously on the UE. For instance, a first application may operate for voice communication via e.g., CDMA 1×, and another second application may operate for data transmission via LTE. However, in some cases, there are restrictions on the total output power a UE can transmit over the multiple transmissions. One example of such restrictions is the UE's specific absorption rate (SAR) regulated by various regulatory bodies, such as FCC in USA. Therefore, depending on UE's implementation, one or more of these applications is restricted to a specified maximum allowed power $P_{CMAX}$, e.g., the data communication application, when the multiple transmission is on-going. In this case, although the UE can support simultaneous multiple radio transmissions, the LTE power headroom reporting needs to take into account of the power usage of all transmissions even though one application may not be aware of the usage of the other. This is particularly so when the power usage due to multiple radio transmissions makes the actual $P_{CMAX}$ on the LTE side smaller than what is originally scheduled. Based on formula (2), the actual remaining power of the UE can be more precisely computed and reported.

$\Delta P$ can be computed based on parameters related to radio transmissions, e.g., the transmission environment such as path loss, modulation scheme used for transmission, or distance between the UE and the base station. A precise formulation to be used for computing $\Delta P$ may depend on the particular type of UE, specific target applications intended to run on such UE, and other application dependent situations.

Figure 3:
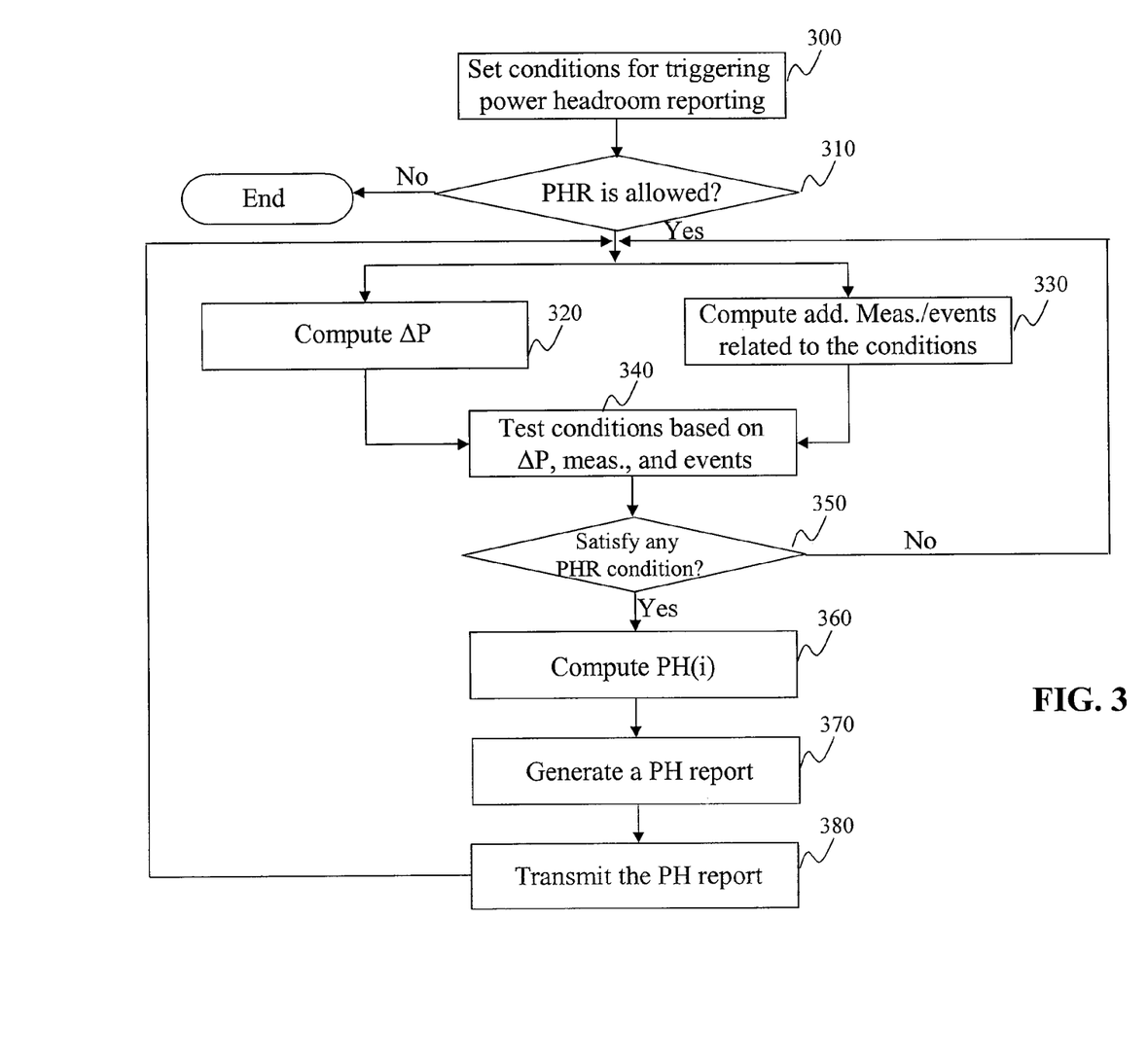
FIG. 3 is a flowchart of an exemplary process in which a mobile device carries out power headroom computation and reporting, in accordance with an embodiment of the present teaching.

FIG. 3 is a flowchart of an exemplary process in which a mobile device carries out power headroom computation and reporting, in accordance with an embodiment of the present teaching. A series of conditions under which power headroom reporting will be triggered are first set up or configured at 300. Based on the configurations, UE will first check, at 310, whether power headroom reporting (PHR) is disabled by upper layer or not. If the PHR is allowed, during operations of a mobile device, power variation $\Delta P$ is computed, at 320. Such computation may be carried out in accordance with some pre-determined time schedule. In some embodiments, $\Delta P$ may be computed periodically based on a fixed time interval. In some embodiments, $\Delta P$ may be computed periodically dynamically based on some condition, e.g., whenever there are multiple radio transmissions occurring. In some embodiments, the computation of $\Delta P$ may be carried out in a mixed mode, e.g., generally in accordance with one fixed time interval and with another periodicity (such as more frequently) if there is a special event such as parallel data transmission. Such computed $\Delta P$ reflects the consumption of power that is otherwise not known but needs to be taken into account when power headroom is considered.

In addition to $\Delta P$, other measurements and events related to triggering the reporting of power headroom are also determined at 330, which include measures included in the braces of formula (2) above. For example, the path loss estimate (PL), the upper layer's signaling to mandate power headroom reporting if configured, and the expiration of the periodicity power headroom reporting timer if configured. Those measures and events are determined in order to test, at 340, whether any of the triggering conditions for power headroom reporting is satisfied. Details related to such a testing to see whether power headroom reporting is triggered are discussed with reference to FIG. 4. If any of the power headroom reporting conditions is satisfied, determined at 350, the actual power headroom estimate at that moment i, namely PH(i), is calculated, at 360, based on measurements of $\Delta P$ and various items in the braces of formula (2). For example, the bandwidth of the PUSCH transmission ($M_{PUSCH}(i)$), path loss estimate (PL), power used when certain modulation is used ($\Delta_{TF}$), and the amount of increase in signal strength determined dynamically by the network (f(i)). The dynamically computed power headroom for that moment i is then used to generate, at 370, a power headroom report and such a power headroom report is then transmitted, at 380, to the base station so that it can be used for the base station to determine on-the-fly whether and how the power used by the underlying mobile device to transmit information can be adjusted. As to the mobile device, once the power headroom report is transmitted, it loops back to continually compute $\Delta P$ and other measurements/events related to power headroom reporting based on some pre-determined schedule.

Figure 4:
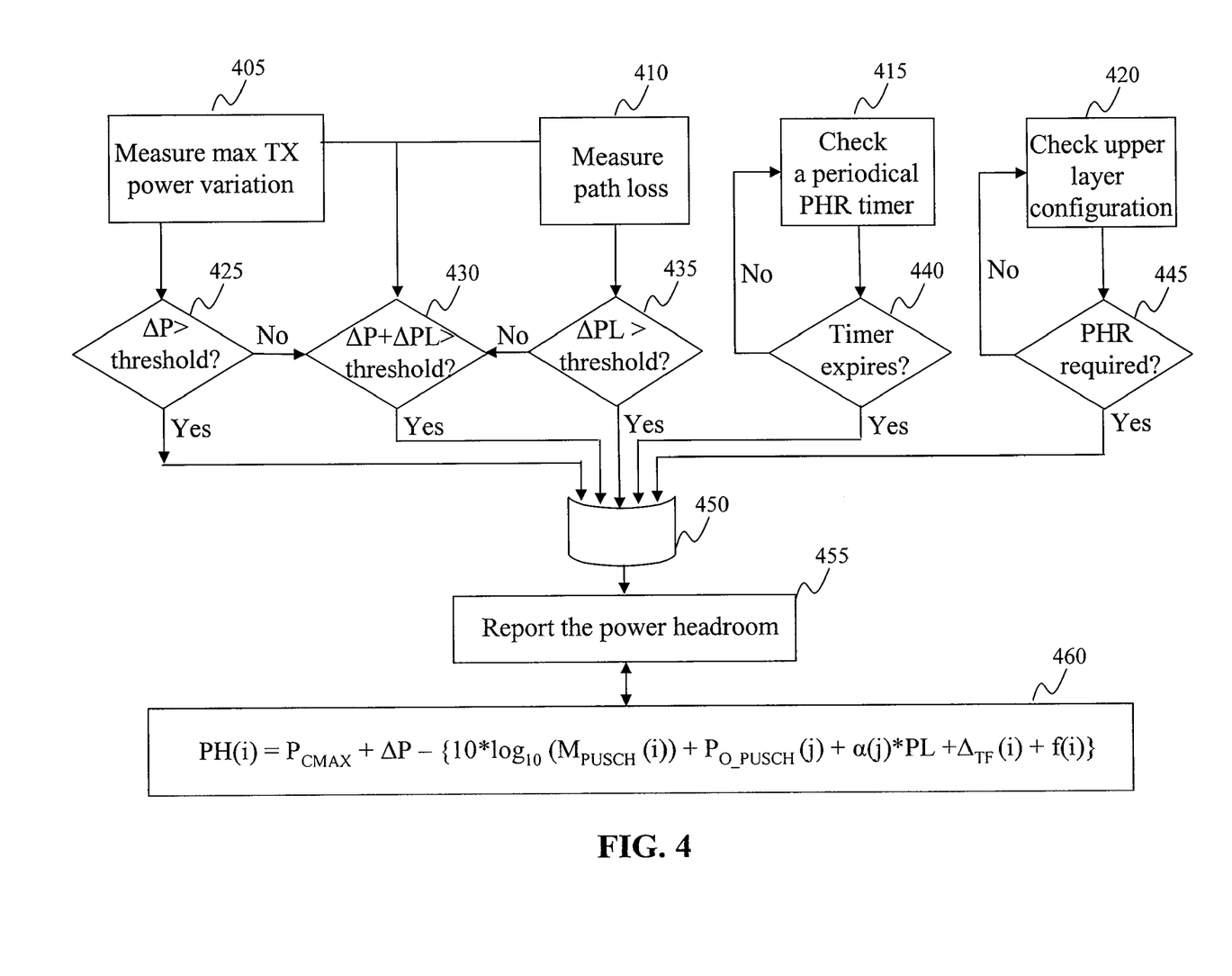
FIG. 4 depicts an enhanced power headroom computation and reporting scheme according to an embodiment of the present teaching.

FIG. 4 depicts an exemplary enhanced power headroom reporting scheme consistent with formula (2) according to an embodiment of the present teaching. In this exemplary scheme, conditions under which power headroom reporting is triggered are disclosed. Consistent with what is described in FIG. 3, various measures related to a determination of power headroom reporting are computed. Specifically, in this illustrated embodiment, $\Delta P$ is computed at 405 to estimate the variation of the maximum transmission power. Some configurations or measurements that are directly related to the conditions to trigger power headroom reporting may also be checked or computed. For instance, since power headroom reporting may be triggered based on path loss, an estimate of path loss is computed at 410. In addition, the configuration related to power headroom reporting on a particular mobile device is checked. As illustrated, a timer that is set for periodic power headroom reporting is examined at 415. Furthermore, as illustrated, the upper layer configuration of the mobile device as to whether power headroom reporting is required is also checked at 420.

Once different measurements are computed, whether dynamic power headroom reporting is triggered is further determined. In the illustrated embodiment, the timing of the power headroom reporting may be determined based on both whether the power headroom reporting timing is appropriate. For example, as to an appropriate timing, it may be checked, at 445, to see whether power headroom reporting is required based on the upper layer configuration of the mobile device. If the upper layer configuration is set in such a way that power headroom reporting is required, power headroom reporting will proceed. If the 445 check returns "No", the mobile device may loop back to 420 to keep checking the upper layer configuration so that when the configuration changes, which may occur at any moment, power headroom reporting may proceed in accordance with the configuration change. If it is required to perform power headroom reporting, the mobile device may enter 455 to proceed actual reporting. Power headroom reporting may also be carried out under other conditions. For instance, power headroom reporting may be performed periodically. In this operation mode, a timer may be deployed in accordance with a set period for power headroom reporting. In this type of situation, the mobile device may check, at 440, to see whether the timer has expired, i.e., reached a point at which power headroom reporting is due. If not, the mobile device may loop back to 415 to continue checking the status of the timer and the loop may continue until the timer expires. When the timer has expired, the mobile device may then enter into a state in which a power headroom reporting operation is actually carried out at 455. In addition to the timer testing, other conditions (see below discussion) may also trigger power headroom reporting.

In some embodiments, dynamic conditions may also be used as measures as to when power headroom reporting is actually performed. As illustrated in FIG. 4, the amount of power variation, $\Delta P$, may be used to determine when power headroom should be reported. Specifically, the mobile device may be configured so that when $\Delta P$ exceeds a certain amount, as determined at 425, it may trigger an actual reporting event. Similarly, the variation in path loss, or APL, may also be used to determine, as shown at 435, whether an actual reporting should be carried out. In some situations, when $\Delta P$ or $\Delta PL$ alone does not exceed a certain threshold but the summation of both does, as determined at 430, it may also trigger a power headroom reporting event. In some embodiments, as long as one of the check logic, i.e. 425, 430, 435, 440 and 445, returns "Yes" to 450, UE will calculate and report the new power headroom based on the formula indicated in 460. This is illustrated in FIG. 4 where when either of illustrated conditions is met, as ORed at 450 based on conditions tested at 425, 430, 435, 440, and 445, it will trigger, at 455, a power headroom reporting event. It is understood that although certain type of logical relationship among specific criteria is shown herein, other types of logical relationships among these specific criteria may also be applied, depending on the needs of underlying applications.

Figure 5:
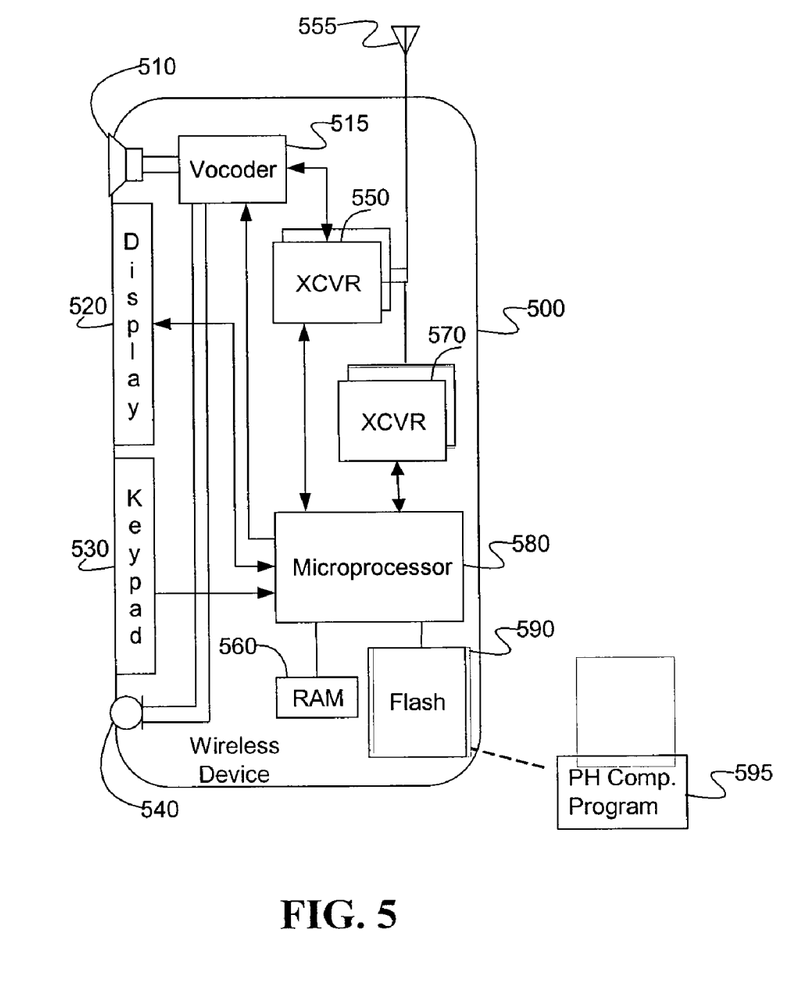
FIG. 5 is a high level functional block diagram of a wireless device, which may be configured to perform power headroom computation and reporting in accord with an embodiment of the present teaching.

FIG. 5 provides a block diagram illustrating an exemplary wireless mobile device 500, which may be the wireless device 105 or 125 of a customer of a network operator. Although the wireless mobile device 500 may be a smart-phone or may be incorporated into another device, such as a portable personal computer, personal digital assistant (PDA) or the like, for discussion purposes, the illustration in FIG. 5 shows the wireless mobile device 500 in the form of a handheld device. The handheld device embodiment of the wireless mobile device 500 may function as a normal digital wireless telephone station. For that function, the mobile device 500 includes a microphone 540 for audio signal input and a speaker 510 for audio signal output. The microphone 540 and speaker 510 connect to voice coding and decoding circuitry (vocoder) 515. For a voice telephone call, for example, the vocoder 515 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile device 500 also includes at least one digital transceiver (XCVR) 550. The mobile device 500 is a multimode device capable of operations on various technology type networks, such as the networks 120 and 135. For example, the handheld device 500 may utilize either or both of 3GPP2 (1XRTT and EVDO) technologies and 3GPP (LTE/GSM/UMTS) technologies. For that purpose, the transceiver (XCVR) 550 could be a multimode transceiver, or the mobile device 500 may include two or more transceivers, e.g., transceivers 550 and 570, each of which supports a subset of the various technologies or modes. The concepts discussed herein encompass embodiments of the mobile device 500 utilizing any digital transceivers that conform to current or future developed digital wireless communication standards.

The transceiver 550 or 570 provides two-way wireless communication of information, such as vocoded speech samples and/or digital message information, in a selected one of the technology modes. The transceiver 550 or 570 also sends and receives a variety of signaling messages in support of the various voice and data services provided via the mobile device 500 and the communication network (described earlier with regard to FIG. 1). Each transceiver 550 or 570 connects through RF send and receive amplifiers (not separately shown) to a set of antenna 555. In the example, the transceiver 550 or 570 is configured for RF communication in accord with a digital wireless protocol, such as the current 3GPP2 and 3GPP protocols. Transceiver 550 or 570 is capable of detecting different network types in any given service area via, e.g., antenna 555. In some embodiments, a mobile device implements the power headroom reporting algorithms, as described herein, locally on the device. In this case, the power headroom reporting capabilities may be turned on whenever the mobile device is activated and does not need to download programs that performs the power headroom reporting algorithms from outside of the mobile device. In some embodiments, a mobile device may be designed to dynamically download programs for power headroom reporting capabilities from a centralized location, e.g., a server, via the network. In this situation, the network communications may also support downloading of programs designed to perform the algorithm for power headroom reporting as described herein and data and/or updates thereof from a server such as 150.

The mobile device 500 includes a display 520 for displaying messages, menus or the like, call related information requested by the user, e.g., calling party numbers, etc. A keypad 530 enables dialing digits for voice and/or data calls as well as generating selection inputs, for example, as may be keyed-in by the user based on a displayed menu or as a cursor control and selection of a highlighted item on a displayed screen. The display 520 and keypad 530 are the physical elements providing a textual or graphical user interface. In addition to normal telephone and data communication related input/output, these elements also may be used for display of menus and other information to the user and user input of selections, if needed during a system selection operation or during a selection software download operation. Various combinations of the keypad 530, display 520, microphone 540 and speaker 510 may be used as the physical input output elements of the GUI, for multimedia (e.g. audio and/or video) communications. Of course other user interface elements may also be used, such as a stylus and touch sensitive display screen, as in a PDA or a smart phone.

A microprocessor 580 serves as a programmable controller for the wireless mobile device 500, in that it controls all operations of the wireless mobile device 500 in accordance with programming that it executes, for all normal operations, and for operations involved in selecting a preferred technology and selecting an available network of the appropriate technology type, for mobile communications. In the example, the wireless mobile device 500 includes flash type program memory 590, for storage of various "software" or "firmware" program routines and mobile configuration settings, such as mobile directory number (MDN) and/or mobile identification number (MIN), etc. The wireless mobile device 500 may also include a non-volatile random access memory (RAM) 560 for a working data processing memory. Of course, other storage devices or configurations may be added to or substituted for those in the example. In a present implementation, the flash type program memory 590 may store firmware such as a boot routine, device driver software, an operating system, call processing software and vocoder control software, and any of a wide variety of other applications, such as client browser software and short message service software. The memories 590 and 560 also store various data, such as telephone numbers and server addresses, downloaded data such as multimedia content, and various data input by the user. Programming 595, implemented to perform the power headroom reporting algorithm as disclosed herein, may be stored in the flash type program memory 590, sometimes referred to as "firmware," and may be loaded into and executed by the microprocessor 580.

Hence, aspects of the methods for power headroom computation and reporting thereof as discussed herein may be embodied in programming. The executable programs from such programming may be stored in the storage of the mobile device, such as RAM 560 or as a flash memory module 595 in the flash memory 590. The data stored with or separate from such power headroom computation and reporting programs may include various lists related to the parameters or conditions configured for power headroom reporting activities, in accord with the algorithm disclosed herein to trigger and compute power headroom.

Program aspects of the technology may be thought of as "products" or "articles of manufacture" typically in the form of executable code and/or associated data that is carried on or embodied in a type of machine readable medium. "Storage" type media include any or all of the non-transitory, tangible memory of the computers, processors, mobile stations or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of software from a computer or processor into the mobile station to add or update the functionality to that device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, "storage" media relates to tangible, non-transitory media for storing programming and/or data, and unless restricted to such "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for power headroom reporting in a mobile device capable of supporting multiple radio transmissions via different channels, comprising steps of:
    estimating the available maximum power variation of a second channel based on power usage in radio transmission of a first channel;
    computing a plurality of measures related to radio transmission via the second channel;
    testing whether one or more conditions for power headroom reporting of the second channel are met in accordance with a configuration with respect to power headroom reporting;
    computing a power headroom based on the estimated power variation relating to the first channel and the radio transmission measures relating to the second channel; and
    transmitting a power headroom report generated based on the computed power headroom.

2. The method of claim 1, wherein the plurality of measures reflect the actual power usage during the radio transmission via the second channel.

3. The method of claim 2, wherein the one or more parameters used in the radio transmission via the first channel include at least one of:
    an estimate of path loss in the radio transmission via the first channel;
    a physical distance between the mobile device and a network to which the radio transmission via the first channel sends a signal;
    a modulation scheme used by the mobile device to perform the radio transmission via the first channel; and
    a signal to noise ratio or signal to interference plus noise ratio specified to meet a certain required quality of service.

4. The method of claim 1, wherein the power variation is estimated based on one or more parameters used in the radio transmission via the first channel.

5. The method of claim 1, wherein the plurality of measures related to radio transmission via the second channel reflect an actual power usage in radio transmission via the second channel.

6. The method of claim 1, wherein the plurality of measures related to radio transmission via the second channel are estimated based on at least one of:

an estimate of path loss in the radio transmission via the first channel;
a coefficient to be used to correct the estimated path loss;
a bandwidth used when the radio transmission via the second channel is performed;
a default power level to be used for radio transmission via the second channel;
a modulation scheme used by the mobile device to perform the radio transmission via the second channel.

7. The method of claim 1, wherein the configuration with respect to power headroom reporting can be set on the mobile device dynamically.

8. The method of claim 1, wherein the one or more conditions for power headroom reporting are specified to control when power headroom reporting is to be carried out.

9. The method of claim 1, wherein the one or more conditions include:
that a configuration in the mobile device indicates that power headroom reporting is required; and
that a timer configured to control periodical power headroom reporting indicates that a power headroom reporting is due.

10. The method of claim 9, wherein the one or more conditions further comprise:
that the estimated power variation being greater than a first threshold;
that an variation in an estimated path loss is greater than a second threshold; and
that a summation of the estimated power variation and the variation of estimated path loss is greater than a third threshold.

11. The method of claim 1, wherein the power headroom is computed based on the following formula:

$$PH(i)=P_{CMAX}+\Delta P-\{10*\log_{10}(M_{PUSCH}(i))+P_{O\_PUSCH}(j)+\alpha(j)*PL+\Delta_{TF}(i)+f(i)\}[dBm]$$

where PH(i) represents the power headroom estimated at moment i, $\Delta P$ represents the estimated power variation of a second channel based on power usage in radio transmission of a first channel, $\{10*\log_{10}(M_{PUSCH}(i))+P_{O\_PUSCH}(j)+\alpha(j)*PL+\Delta_{TF}(i)+f(i)\}$ represents the plurality of measures associated with the radio transmission via the second channel, and $P_{CMAX}$ represents a maximum power allowed on the mobile device power class.

12. A mobile device capable of supporting multiple radio transmissions via different channels, comprising:
at least one transceiver capable of providing two-way communication of information in a plurality of modes via different channels;
a microprocessor configured to be a programmable controller for controlling operations of the mobile device; and
a storage configured to store information to be accessed and used by the microprocessor to facilitate multiple radio transmission and operations related thereto, wherein, at least one of the at least one transceiver and the microprocessor is configured to
estimate the available maximum power variation of a second channel based on power usage in radio transmission of a first channel;
compute a plurality of measures related to radio transmission via the second channel;
test whether one or more conditions for power headroom reporting of the second channel are met in accordance with a configuration with respect to power headroom reporting;
compute a power headroom based on the estimated power variation relating to the first channel and the radio transmission measures relating to the second channel; and
transmit a power headroom report generated based on the computed power headroom.

13. The mobile device of claim 12, wherein the plurality of modes include an audio mode and a data mode.

14. The mobile device of claim 12, wherein the storage includes
a non-volatile random access memory; and
a flash memory.

15. The mobile device of claim 12, wherein the information stored in the storage includes
software instructions to be executed by the microprocessor to control the operations of the mobile device; and
firmware to be executed by the microprocessor to control the operations of the mobile device.

16. The mobile device of claim 12, wherein the storage stores a power headroom reporting program as well as parameters or conditions configured for computing power headroom reporting related measures and triggering power headroom reporting.

17. A machine-readable medium having instructions recorded thereon, the instructions, when read by the machine, causes the machine to perform the functions of:
estimating the available maximum power variation of a second channel based on power usage in radio transmission of a first channel;
computing a plurality of measures related to radio transmission via the second channel;
testing whether one or more conditions for power headroom reporting of the second channel are met in accordance with a configuration with respect to power headroom reporting;
computing a power headroom based on the estimated power variation relating to the first channel and the radio transmission measures relating to the second channel; and
transmitting a power headroom report generated based on the computed power headroom.

18. The medium of claim 17, wherein the plurality of measures reflect the actual power usage during the radio transmission via the second channel.

19. The medium of claim 17, wherein the power variation is estimated based on one or more parameters used in the radio transmission via the first channel.

20. The medium of claim 17, wherein the plurality of measures related to radio transmission via the second channel reflect an actual power usage in radio transmission via the second channel.

21. The medium of claim 17, wherein the configuration with respect to power headroom reporting can be set on the mobile device dynamically.

22. The medium of claim 17, wherein the power headroom is computed based on the following formula:

$$PH(i)=P_{CMAX}+\Delta P-\{10*\log_{10}(M_{PUSCH}(i))+P_{O\_PUSCH}(j)+\Delta(j)*PL+\Delta_{TF}(i)+f(i)\}[dBm]$$

where PH(i) represents the power headroom estimated at moment i, $\Delta P$ represents the estimated power variation of a second channel based on power usage in radio transmission of a first channel, $\{10*\log_{10}(M_{PUSCH}(i))+P_{O\_PUSCH}(j)+\Delta(j)*PL+\Delta_{TF}(i)+f(i)\}$ represents the plurality of measures associated with the radio transmission via the second channel, and $P_{CMAX}$ represents a maximum power allowed on the mobile device power class.

* * * * *